United States Patent

Dohmeier

(10) Patent No.: US 6,520,231 B1
(45) Date of Patent: Feb. 18, 2003

(54) TIRE CHAIN LINK WITH TRACTION MEMBERS

(75) Inventor: Hans-Otto Dohmeier, Johannesburg (ZA)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/830,156
(22) PCT Filed: Nov. 2, 1999
(86) PCT No.: PCT/ZA99/00115
§ 371 (c)(1), (2), (4) Date: Jun. 29, 2001
(87) PCT Pub. No.: WO00/26046
PCT Pub. Date: May 11, 2000

(30) Foreign Application Priority Data

Nov. 3, 1998 (ZA) .................................. 98/10022

(51) Int. Cl.⁷ ................................................ B60C 11/00
(52) U.S. Cl. ........................................ 152/231; 152/242
(58) Field of Search .................. 152/231, 232, 152/233, 242, 241, 243

(56) References Cited

U.S. PATENT DOCUMENTS

| | | | | |
|---|---|---|---|---|
| 2,438,248 A | * | 3/1948 | Madison | 152/243 |
| 3,714,975 A | * | 2/1973 | Muller | 152/243 |
| 3,892,268 A | * | 7/1975 | Asbeck | 152/243 |
| 4,171,718 A | | 10/1979 | Walrave et al. | |
| 4,243,088 A | * | 1/1981 | Labonville | 152/242 |
| 4,262,723 A | | 4/1981 | de Previnquieres | |
| 4,357,975 A | * | 11/1982 | Baldry | 152/179 |
| 4,403,639 A | * | 9/1983 | Holte | 152/245 |
| 4,411,301 A | * | 10/1983 | Bindel | 152/232 |
| 4,544,010 A | * | 10/1985 | Friedewald | 152/231 |
| 4,997,019 A | * | 3/1991 | Muller et al. | 152/242 |
| 5,058,645 A | * | 10/1991 | Muller | 152/243 |
| 5,072,763 A | * | 12/1991 | Muller et al. | 152/231 |
| 5,423,365 A | * | 6/1995 | Labonville | 152/243 |
| 6,039,100 A | * | 3/2000 | Muller | 152/243 |

FOREIGN PATENT DOCUMENTS

DE  43 33 262  11/1994

* cited by examiner

*Primary Examiner*—S. Joseph Morano
*Assistant Examiner*—Long Bao Nguyen
(74) *Attorney, Agent, or Firm*—Burns, Doane, Swecker & Mathis, LLP

(57) ABSTRACT

A link for a tire chain including a tread portion and flanking side-wall portions with at least the tread portion including vertically extending links, three or four of which are interconnected by horizontal connectors to form a mesh of a desired shape. The link includes a base portion, a medial portion and a head portion, with at least one traction member of a material that is relatively harder than the material of the link partially embedded in the head portion and partially exposed on the surface of the head portion. The traction member may be in the form of tungsten carbide buttons or plates secured in holes in the head portion of the link or may be in the form of a plurality of particles consolidated in a cemented compact or steel matrix that is secured to the head portion of the link, either by being cast or formed on the head portion or by being provided on a body that is weldable to the head portion.

18 Claims, 2 Drawing Sheets

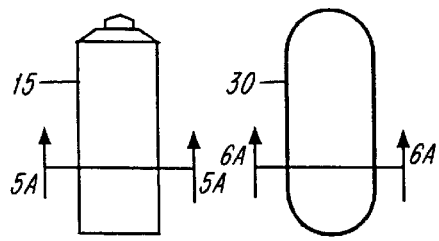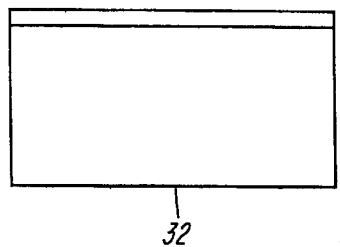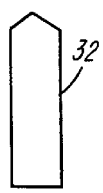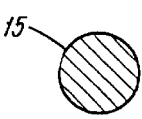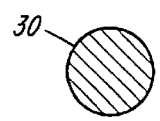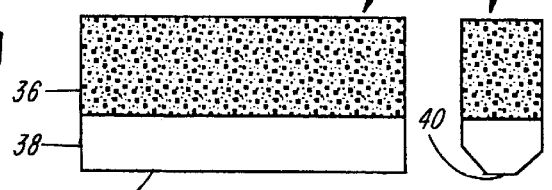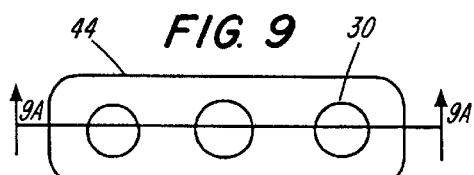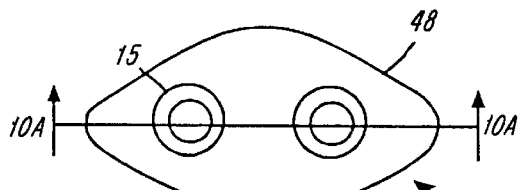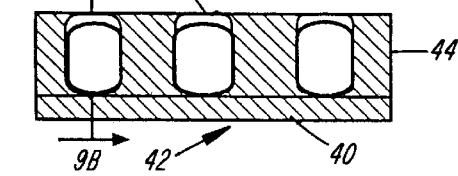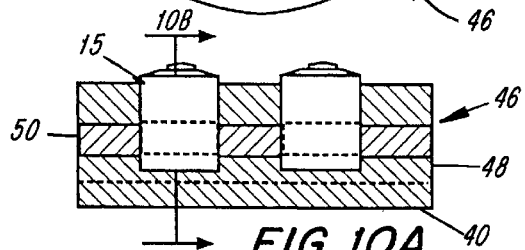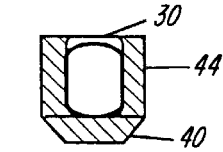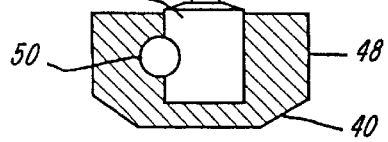

TIRE CHAIN LINK WITH TRACTION MEMBERS

TECHNICAL FIELD

This invention relates to steel chain links, having application primarily, though not exclusively, in tire chains for heavy duty vehicles, such as for mining, quarrying, earth-moving and forestry applications, to protect the rubber tires on one or more axles of such vehicles and/or provide additional traction.

BACKGROUND ART

Tire chains of the type with which this invention is concerned have a treed portion spanning the tread of a tire and two flanking side-wall portions that respectively span a portion of the inner and outer side-walls of the tire. The chain is composed of links that extend substantially normal to the surface of the tire and connecting rings or connectors interconnecting the links to form a net of a desired pattern. This type of tire chain is referred to as "a tire chain of the type set forth" below.

Tread links each comprise a base portion to provide a smooth, suitably large contact area with a tire in use; a medial portion formed with at least one opening through which a connector can be threaded, with the lateral thickness being reduced relatively to the base portion to permit increased lateral movement with respect to the connectors; and a head portion of a shape suited to the intended application of the chain. A broad head portion that may have a diamond shape decreases the mesh opening and thereby increases protection, whilst a relatively thinner head portion decreases protection and increases traction. Protrusions in the form of ribs or buttons of the material of the link of various configurations, shapes and sizes may be provided to increase traction, but these have limited long term value as they wear away fairly rapidly in use, particularly if they are operated in highly abrasive conditions such as chrome mines, smelting works and on silica. Whilst increasing the hardness of the link to inhibit wear is possible, the benefits obtained are usually more than counteracted by the increased tendency of the link to fracture or break in use.

This invention seeks to provide a link for a tire chain that has a reduced tendency to slip in use and/or has increased resistance to wear. Optionally the invention seeks to provide a method of modifying a tire chain to increase the traction and/or wear resistance properties thereof; to provide a method of restoring tire chains that have worn in use; and/or to provide parts or components for use in the aforesaid methods or in a tire chain.

DISCLOSURE OF THE INVENTION

The invention provides a link for a tire chain of the type set forth comprising a base portion, a medial portion and a head portion, characterised in that the link has at least one traction member of a material that is relatively harder than the material of the link partially embedded in the head portion and partially exposed on the surface of the head portion.

The link may have the following features, alone or in combination:

- the traction member may be in the form of a solid body, such as a cylinder that is preferably substantially round in cross-section or a thick plate locked in an opening formed in the head portion of the link;
- a plurality of such solid body traction members may be arranged at desired positions on the head, either adjacent to or spaced apart from one another;
- the traction member may be in the form of a particle in which event a plurality of such particles are preferably consolidated in a cemented compact or steel matrix;
- the traction member is of a suitable hard, abrasion resistant carbide, nitride and the like compounds in particle, cemented or sintered form;
- the traction member or members are secured to a body that is weldable to the head portion of the link. The latter form is particularly suited to restoring links that have worn in use, but may also be used for new chain links.

The invention also includes a tire chain of the type set forth characterised by having at least one link of the invention.

Further features, variants, and/or advantages, of the invention will become apparent from the following, non-limiting description made with reference to the accompanying schematic drawings of presently preferred examples of the invention and from the claims, which are to be regarded as an integral part of this description.

BRIEF DESCRIPTION OF THE DRAWINGS

FIG. 5 shows a side view and a cross-section of an embodiment of traction member for a link of the invention;

FIG. 6 shows a side view and a cross-section of another embodiment of traction member for a link of the invention;

FIG. 7 shows a side view and an end view of another embodiment of traction member for a link of the invention;

FIG. 8 shows a side view and an end view of yet another embodiment of traction member for a link of the invention;

FIG. 9 shows plan and sectioned side and end views of an embodiment of tread member of the invention; and FIG. 10 shows plan and sectioned side and end views of yet another embodiment of tread member of the invention.

Figure 1:
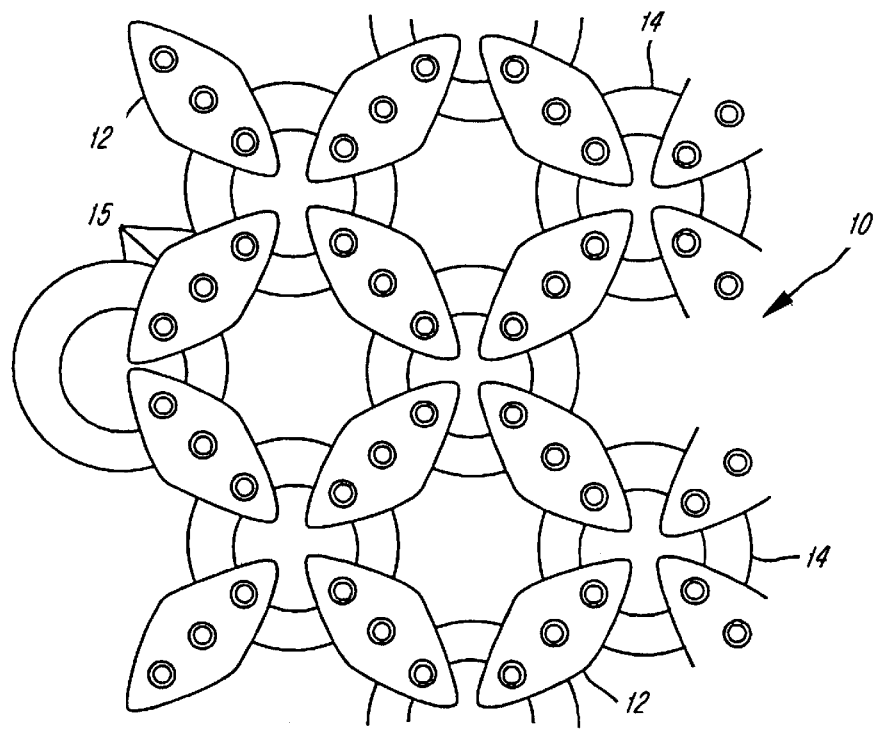
FIG. 1 shows a portion of a tread portion of a tire chain including links of the invention.

BEST KNOWN MODE FOR CARRYING OUT THE INVENTION AND DESCRIPTION OF PREFERRED EMBODIMENTS

In the drawings the same or similar parts have the same reference numbers, certain parts having sub-numbers to identify them for this description.

FIG. 1 shows a portion of a tire chain 10 comprising links 12 threaded onto and interconnected by welded ring connectors 14. Four links are threaded onto each connector to form a mesh with a square pattern. As shown each link has a diamond shaped head portion that maximises the surface area covered by the chain for optimum protection. Each link has three traction members 15 in the form of stepped-nose, cylindrical, tungsten-carbide button bits. The bits 15 are shown in detail in FIG. 5.

Figure 2:
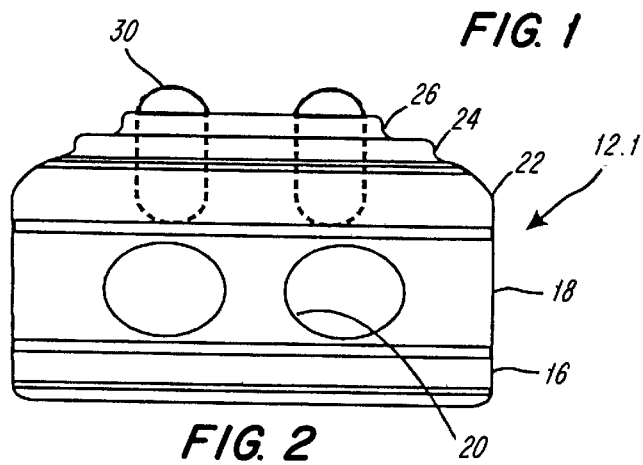
FIG. 2 shows a side view of a link of the invention.
Figure 3:
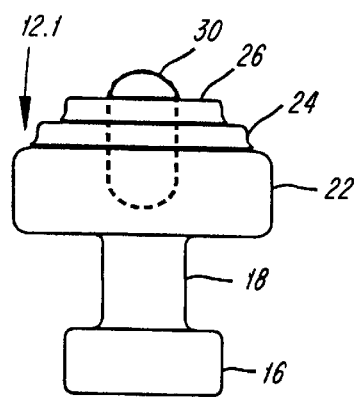
FIG. 3 shows an end view of the link of FIG. 2.
Figure 4:
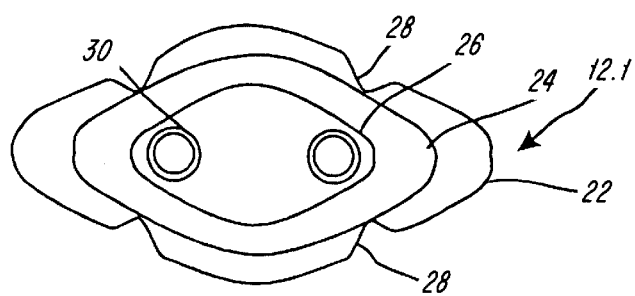
FIG. 4 shows a plan view of the link of FIG. 2.

FIGS. 2 to 4 show a link 12.1 comprising a base portion 16, a medial portion 18 formed with two oval eyes or openings 20, and a diamond shaped head portion 22. Stepped layers 24 and 26, each of a diamond shape are formed on the top of the head portion. The stepped layers provide traction formations to inhibit slipping, ie. increase traction, of the chain. Vertically extending grooves 28 are formed in the edges of the head portion 22, the grooves extending in depth to the shoulder of the first layer 24. The grooves provides additional grip, which persists in use even when the stepped layers 24 and 26 have been worn away. Two traction members 30 in the form of round-nose, cylindrical, tungsten-carbide button bits are brazed into holes in the head portion of the link. The bits 30 are shown in greater detail in FIG. 6.

FIG. 7 shows a substantially rectangular, thick plate traction member 32 formed as a sintered tungsten carbide body. This traction member is dimensioned substantially to span the length of the head of a link and has one of its longitudinal edges bevelled as shown. In use, the traction member is secured to a link by brazing it into a slot extending along the length of the head, with the bevelled edge being exposed. The upper edge of the bevelled portion need not be flat as shown and may slope downwards from the centre towards, or vice versa, for increasing its gripping or traction properties in use.

FIG. 8 shows an elongate, rectangular tread member 34 comprising a wear resistant portion 36 and a body portion 38. The wear resistant portion 36 forms a traction member and is a compact or matrix of tungsten carbide particles embedded in a suitable steel alloy. The body portion 38 is of a weldable steel or cast iron or steel alloy, which may be the same steel alloy as used to embed the tungsten carbide, and has a lower edge 40 that is bevelled on both sides to facilitate welding it to a link. The lower edge 40 need not be bevelled and can be a flat edge. The tread member is dimensioned substantially to span the width and length of the head of a link. In use, the tread member may be welded to a worn link, ie. one in which the head has been worn away through use, to restore the link or may be welded to a new link for a new tire chain.

FIG. 9 shows a tread member 42 comprising a substantially rectangular body 44 having a bevelled lower edge and three button bits 30 press fitted into holes in the body. The button bits are shorter than the holes into which they are pressed and secured in the holes by peening the mouth portions of the holes. This securing method is suited for use with tire chains that will be used in silica sands, because in use sand particles enter the hole and wedge between the button bits and the walls of the holes to secure the button bits. It is not suited for tire chains that will be used on, for example, hot slag as the thermal expansion of the steel is greater than that of the button bits, so that the holes widen and the bits fall out.

FIG. 10 shows a tread member 46 comprising a weldable steel body 48 that is diamond shaped in plan view and two button bits 15 secured in holes in the body by a cross-pin 50. The steel of the body can have a low hardness for manufacture, eg. about 30 HRC (hardness Rockwell "C" scale) which can then be heat treated to about 55 to 60 HRC after fitting the button bits and cross-pin.

Apart from increasing traction the tread members also increase the wearing properties of the link because of their hardness. Typically the tungsten carbide bits or particles have a hardness of 86 to 92 HRA (Rockwell hardness "A" scale) that resists wear and the steel of the link has a hardness of 50 to 60 HRC that is sufficiently hard in combination with the harder buttons not to wear away unacceptably rapidly and at the same time soft enough not to be too brittle to break under bending forces in use.

The invention is not limited to the precise details described above and shown in the drawings. Modifications may be made and other embodiments developed without departing from the scope of the invention as defined in the claims.

What is claimed is:

1. A link for tire chains comprising:
   a body formed of a metallic first material and including:
      a base portion adapted to contact a tire, and
      a head portion connected to the base portion through a medial portion, and
   at least one traction member partly embedded in the head portion and projecting therefrom in a direction away from the base portion, the traction member formed of a second material harder than the first material.

2. The link according to claim 1 wherein the traction member comprises a solid body fixedly mounted in an opening formed in the head portion.

3. The link according to claim 2 wherein the traction member is generally cylindrically shaped.

4. The link according to claim 2 wherein the traction member comprises an elongated plate.

5. The link according to claim 2 wherein the traction member comprises hard particles consolidated in a cemented compact.

6. The link according to claim 5 wherein the traction member comprises hard particles consolidated in a steel matrix.

7. The link according to claim 1 wherein the traction member comprises carbide particles.

8. The link according to claim 7 wherein the carbide particles are sintered.

9. The link according to claim 7 wherein the carbide particles are cemented.

10. The link according to claim 1 wherein the traction member comprises nitride particles.

11. The link according to claim 10 wherein the nitride particles are sintered.

12. The link according to claim 10 wherein the nitride particles are cemented.

13. The link according to claim 1 wherein the traction member is secured to a body that is welded to the head portion.

14. The link according to claim 1 wherein the medial portion has openings extending therethrough and adapted to receive respective chain connectors.

15. A link for tire chains comprising:
   a body formed of a metallic first material, and including:
   a base portion adapted to contact a tire, and
      a head portion connected to the base portion through a medial portion, the medial portion including openings adapted to receive chain connectors, and
   a plurality of traction members partly embedded in the head portion and projecting therefrom in a direction away from the base portion, the traction members being brazed in the head portion and formed of a second material harder than the first material.

16. A link for tire chains comprising:
   a first metallic body including:
      a base portion adapted to contact a tire, and
      a head portion connected to the base portion through a medial portion, the medial portion including openings adapted to receive chain connectors, and
   a tread member mounted in the body, the tread member including an elongated second metallic body embedded in, and welded to, the head portion, the traction member protruding beyond the head portion and formed of a harder material harder than second bodies.

17. A tire chain comprising connecting elements and links fixed to the connecting elements, each link comprising:
  a body formed of a metallic first material and including:
    a base portion adapted to contact a tire, and
    a head portion connected to the base portion through a medial portion, and
  at least one traction member partly embedded in the head portion and projecting therefrom in a direction away from the base portion, the traction member formed of a second material harder than the first material.

18. The tire chain according to claim 17 wherein the connecting elements comprise metallic rings, the medial portion of each link comprising openings through which respective rings extend, the rings being welded to respective links.

* * * * *